United States Patent [19]

Jones

[11] 4,237,369

[45] Dec. 2, 1980

[54] WILD STRESS RELIEF POWER SUPPLY APPARATUS

[76] Inventor: Robert H. Jones, P.O. Box 1518, Stouffville, Ontario, Canada, L0H 1L0

[21] Appl. No.: 8,041

[22] Filed: Jan. 31, 1979

[51] Int. Cl.³ ............................................. H05B 1/02
[52] U.S. Cl. ................................... 219/503; 307/38; 307/37; 219/494; 219/486; 219/483
[58] Field of Search ............... 219/483, 486, 494, 503, 219/485; 307/38-41, 117

[56] References Cited

U.S. PATENT DOCUMENTS

| | | | |
|---|---|---|---|
| 3,247,361 | 4/1966 | Woodley | 219/483 |
| 3,432,643 | 3/1969 | Finnegan et al. | 219/503 X |
| 3,851,148 | 11/1974 | Schoner et al. | 219/503 |
| 4,066,867 | 1/1978 | Bechtel | 219/483 |

*Primary Examiner*—B. A. Reynolds
*Assistant Examiner*—M. Paschall

*Attorney, Agent, or Firm*—Staas and Halsey

[57] ABSTRACT

Temperature responsive power supply apparatus for electrical resistance heating, e.g. for weld stress relief, has a power supply transformer comprising first and second secondary windings in series with one another and first, second and third conductors for connecting the secondary windings to heating elements. A pair of temperature sensors provide temperature signals corresponding to the temperatures of heated zones heated by the apparatus, and a pair of control units responsive to the temperature signals control the current flow through the conductors. A switch enables one or both control units to regulate saturable reactors or the like in series with the conductors, whereby the control unit can regulate two respective heating circuits each including one of the secondary windings or one of the control units can regulate a heating circuit including one or both of the secondary windings. The apparatus provided improved versatility for heating one or more large or small pipe welds.

6 Claims, 6 Drawing Figures

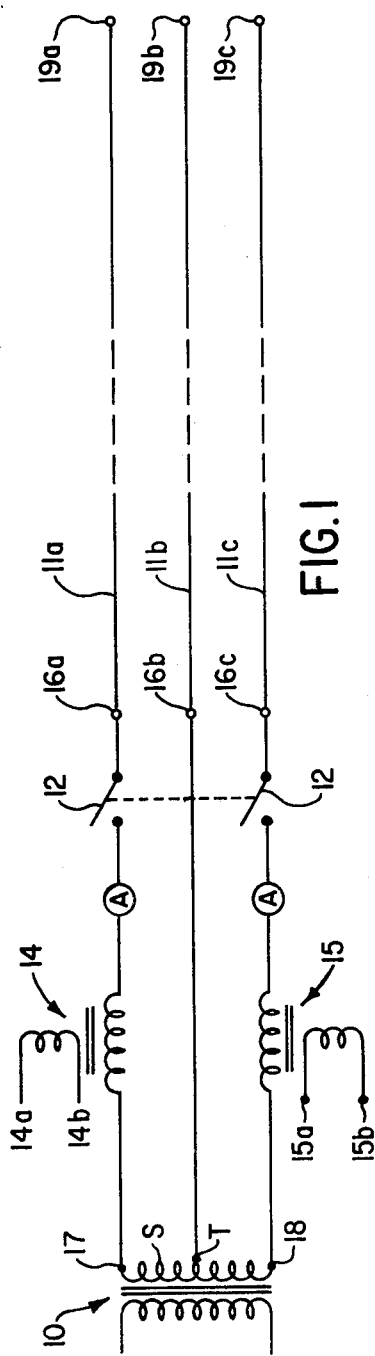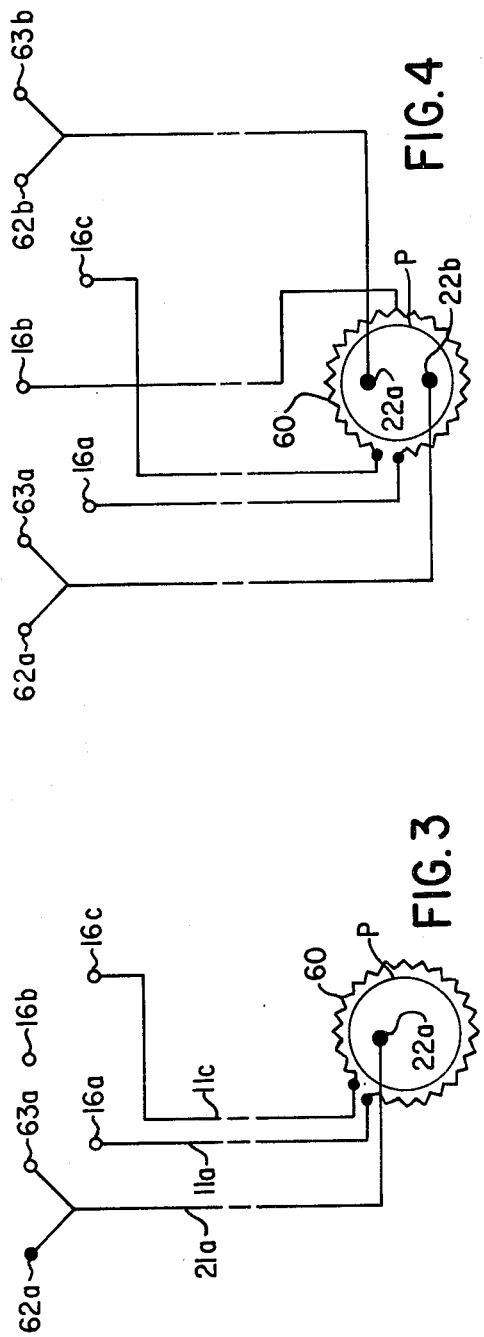

WILD STRESS RELIEF POWER SUPPLY APPARATUS

FIELD OF THE INVENTION

The present invention relates to temperature responsive power supply apparatus for electrical resistance heating, and is useful in particular, but not exclusively, for the preheat treatment and stress relief of pipe welds and other welds.

DESCRIPTION OF THE PRIOR ART

In U.S. Pat. No. 3,851,148, issued Nov. 26, 1974 jointly to Heinz E. Schonert and the present inventor, there is disclosed a power control apparatus for weld stress relief by means of which temperature signals corresponding to the temperatures at different workpiece zones are employed to actuate switch means controlling the voltage applied to a saturable reactor. The saturable reactor, in turn, controls by supply of electrical power from a power supply transformer to two electrical resistance heating elements. When the apparatus is in operation, both of the heating elements are initially energized to heat upper and lower portions of a pipe. Heated air in the interior of the pipe rises, and the uppermost portion of the pipe is therefore subjected to greater heating than the lowermost portion of the pipe. By operation of the saturable reactor, the heating element heating the uppermost portion of the pipe is de-energized, when necessary, while the heating of the lowermost portion of the pipe is maintained by the other heating element.

The two heating elements are connected in series with one another across a secondary winding of the power supply transformer.

OBJECT OF THE INVENTION

It is an object of the present invention to provide a novel and improved power supply apparatus for electrical resistance heating which provides greater flexibility of operation than has been available hitherto.

BRIEF SUMMARY OF THE INVENTION

According to the present invention, there is provided temperature responsive power supply apparatus for electrical resistance heating, comprising power supply transformer means for transforming an electrical supply current, the power supply transformer means comprising first and second secondary winding means in series with one another for delivering electrical power from the power supply transformer means; first, second and third conductors for connecting the secondary windings to heating elements; means for connecting the first conductor between the first and second secondary winding means; means for connecting the second and third conductors to opposite ends of the first and second secondary winding means, whereby the apparatus can be operated to deliver electrical power in a first operational mode from both of the secondary winding means in a single heating circuit, in a second operational mode from the first and second secondary winding means in two heating circuits with the first conductor common to the two heating circuits, and a third operational mode from one of the first and second secondary winding means in a single heating circuit; a pair of temperature sensing means for providing respective temperature signals corresponding to the temperatures of respective zones heated by the apparatus; a pair of current control means respectively associated with the second and third conductors for controlling the flow of electrical current therethrough; a pair of means respectively associated with the temperature sensing means and respectively responsive to the temperature signals for operating the current control means to reduce the electrical current flow when the temperatures reach predetermined values; and switching means for selectively connecting the pair of temperature signal responsive means to the pair of current control means, respectively, in a first switching position for independent control of the current control means and for connecting one of the temperature signal responsive means to both of the current control means for simultaneous operation thereof in a second switching position.

BRIEF DESCRIPTION OF THE DRAWINGS

The invention will be more readily understood from the following description of a preferred embodiment thereof given, by way of example, with reference to the accompanying drawings, in which:

FIG. 1 shows a power supply transformer, a pair of saturable reactors and three current conductors or leads forming parts of a temperature responsive power supply apparatus;

FIGS. 3 to 5 show heating elements connected for energization by the apparatus of FIGS. 1 and 2 in first, second and third operational modes, respectively, for heating a single pipe.

DESCRIPTION OF THE PREFERRED EMBODIMENT

Figure 2:
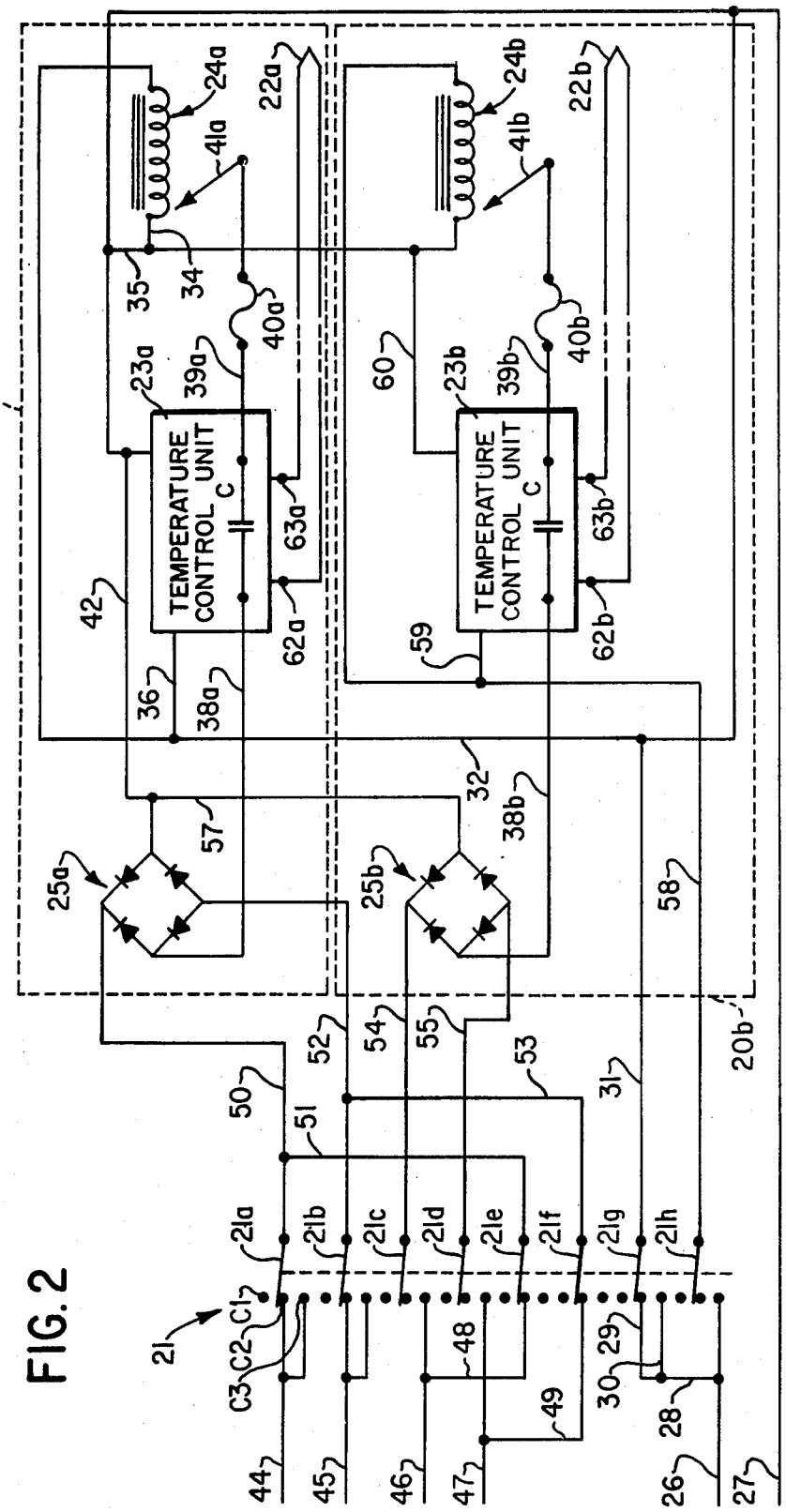
FIG. 2 shows a circuit diagram of temperature control and switching means forming part of the same apparatus.

As shown in FIG. 1, a power supply transformer indicated generally by reference numeral 10 has a centre-tapped secondary winding S. Three electrical conductors 11a, 11b and 11c are provided for connecting the secondary winding S to heating elements, as described in greater detail hereinafter.

The conductors 11a and 11c are connected through linked on-off switches 12, ammeter A and saturable reactors, indicated generally by reference numerals 14 and 15, to opposite terminals 17 and 18 of the transformer secondary winding S.

The on-off switches 12 may be provided as a double pole circuit breaker incorporating isolator means and overload/short circuit protection, and it will be appreciated that, while the switches 12 are preferably linked for safety reasons, it is alternatively possible to employ separate switches, i.e. switches which are not linked or otherwise connected together, in which case when only one of the switches is closed, a voltage would still exit between the conductor 11b and the conductor 11a or 11c connected to the closed switch.

Referring now to FIG. 2, reference numerals 20a and 20b indicate generally two temperature control devices, and reference numeral 21 indicates generally a switching arrangement for controlling the connection of the temperature control devices 20a 20b to the saturable reactors 14 and 15.

For convenience, the components of the two temperature control devices 20a and 20b have been indicated by the same reference numerals followed, respectively, by the letters "a" and "b", and only the temperature control device 20a will be described hereinafter, it being understood that the temperature control device 20b is similar.

The temperature control device 20a comprises a thermocouple 22a connected to a temperature control unit 23a.

The temperature control unit 23a has normally open contacts C which are closed when power is applied to the temperature control unit 23a and the temperature sensed by the thermocouple 22a is below a predetermined value. A variable transformer 24a is provided for applying a variable voltage across a rectifier bridge indicated generally by reference numeral 25a on closure of the contacts C.

The temperature control devices 23a and 23b are commercially available temperature controllers, for example those marketed under Model No. 32103 by Thermo Electric Co. Inc. of Saddle Brook, N.J., and are therefore not described in greater detail herein. However, it will be understood by those skilled in the art that such a controller operates by opening the contacts C when a temperature signal supplied thereto from its thermocouple reaches the above-mentioned predetermined value, which can be preset by manual adjustment of the controller.

The circuitry illustrated in FIG. 2 is energized by an a.c. current supply through supply conductors 26 and 27. The supply conductor 26 is connected to one end of the variable transformer 24a through conductors 28, 29 or 30, the switching arrangement 21 and conductors 31 and 32.

The opposite end of the variable transformer 24a is connected through conductors 34 and 35 to the other supply conductor 27.

The temperature control unit 23a is connected to supply conductor 27 and, via conductors 36, 32 and 31, switching arrangement 21, conductor 29 or 30 and conductor 28, to the supply conductor 26 for energization of the temperature control unit 23a.

Normally open contacts C of temperature control unit 23a are respectively connected by conductor 38a to one arm of the rectifier bridge 25a and by conductor 39a, provided with fuse 40a, to arm 41a of the variable transformer 24a.

The opposite arm of the bridge 25a is connected by conductor 42 to the supply conductor 27.

The switching arrangement 21 has eight movable contacts or switches 21a to 21h which are linked for simultaneous actuation and which are actuatable into three different positions to make contact with fixed contacts C1, C2 and C3. C1 represents the "off" positions of the contacts 21a to 21h.

Contacts C2 and C3 of the two switches 21a and 21b are connected by respective conductors 44 and 45 to the control terminals 14a and 14b of the saturable reactor 14.

Contacts C3 of the switches 21c and 21d are connected by conductors 46 and 47 to the control terminals 15a and 15b of the saturable reactor 15, and contacts C2 of the switches 21d and 21f are connected by respective conductors 48 and 49 to the conductors 46 and 47 and thus, likewise, to the saturable reactor control terminals 15a and 15b. Switches 21a and 21e are connected, by conductors 50 and 51, and switches 21b and 21f are connected by conductors 52 and 53, to opposite arms of the rectifier bridge 25a.

Switches 21c and 21d are connected by conductors 54 and 55 to opposite arms of the rectifier bridge 25b.

One arm of the rectifier bridge 25b is connected by conductor 38b to the normally open contacts C of the temperature control unit 23b and the opposite arm is connected to conductors 57 and 42 to the supply conductor 27.

Switch 21h is connected by conductor 58 to one end of saturable reactor 24b, the other end of which is connected to the conductor 35 and thus to the supply conductor 27. Temperature control unit 23b, for energization thereof upon closure of switch 21h, is connected by conductors 59 and 60 across conductors 58 and 35.

Referring again to FIG. 1, three electrical plug and socket connectors 16a, 16b and 16c are provided for connecting the conductors 11a to 11c to the power supply transformer 10, the connectors 16a and 16c being in series with the on-off switches 12 and the connector 16b being connected to a centre-tapping CT of the transformer secondary winding S.

The conductors 11a to 11c are in the form of insulated electrical cables and are provided, at their ends remote from the power supply transformer 10, with terminals 19a, 19b and 19c.

Any two or all three of the conductors 11a to 11c may be utilized at the same time, as required, and due to the provision of the connectors 16a to 16c, any one of the conductors 11a to 11c which is not in use may be readily disconnected and stored in a convenient place.

Before the operation of the above-described apparatus is explained, the various ways in which the heating elements may be connected to the power supply transformer 10 by the conductors 11a to 11c will firstly be described with reference to FIGS. 3 to 6.

It will be understood that the heating elements referred to herein each comprise, in practice, a plurality of individual electrical resistance heating elements, commonly referred to as "finger elements", connected in series.

Referring now to FIG. 3, which illustrates a first operational mode of the above-described apparatus, a heating element 60, which comprises a plurality of finger elements connected in series, is provided for heating the upper and lower portions of a pipe P, the heating element 60 being connected across the conductors 11a and 11c, and thus across the entire transformer secondary winding S.

In this first operational mode, the conductor 11b and the thermocouple 22b are removed. The thermocouple 22a, which as shown in associated with the upper portion of the pipe P for sensing the temperature at the location, is connected by a dual lead 21a, to terminals 62a and 63a of the temperature control unit 23a. This first operational mode thus provides temperature sensing at a single location.

In FIG. 4, which shows a second operational mode, the heating element 60 again extends around the upper and lower portions of the pipe P, but in this case the conductor 11b is employed as a common conductor connected between the heating element 60, at a point midway between the ends of the heating element 60, and, through connector 16b, the centre-tapping CT of the transformer secondary winding S. In other words, the two halves of the heating element 60 are connected across opposite halves of the secondary winding S.

Also, both thermocouples 22a and 22b are in use for sensing the temperatures of the lower and upper portions, respectively, of the pipe P, i.e. at two separate locations.

Figure 5:
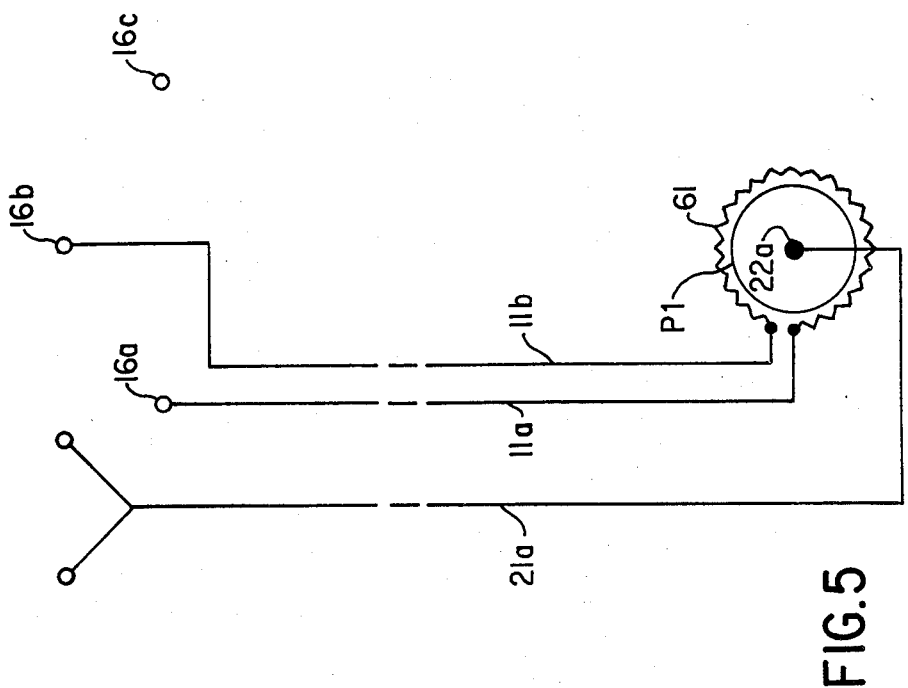

In a third operational mode, illustrated in FIG. 5, a heating element 61 is associated with the upper and lower portions of a pipe P1 and connected by conductors 11a and 11b across the transformer end terminal 17 and the centre-tapping CT, i.e. across only half of the secondary winding S. The pipe P1 is of smaller diameter than the pipe P and therefore requires less electrical power for heating, and thus only half of the secondary winding S need be utilized in this case. The thermocouple 22b is again omitted, only the thermocouple 22a being in use.

Figure 6:
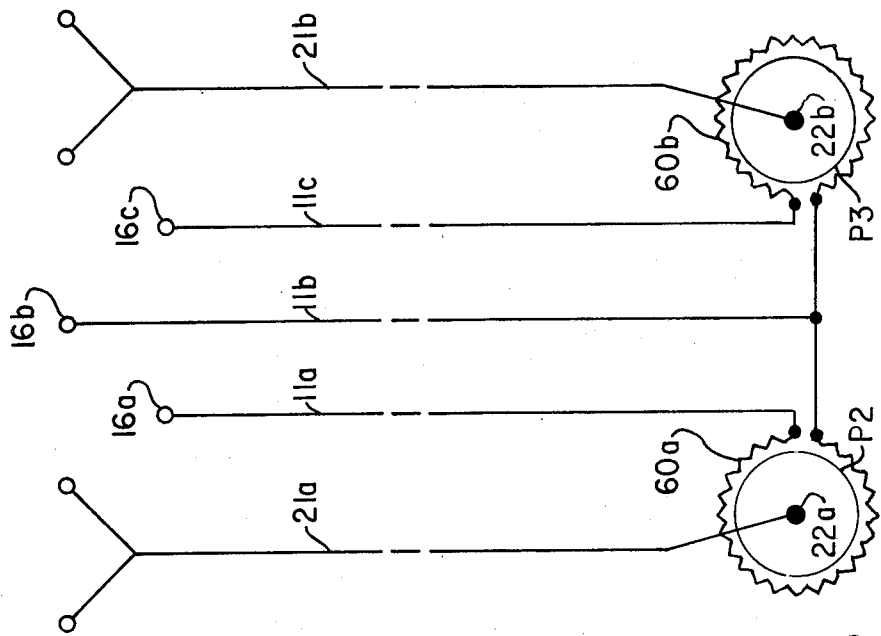
FIG. 6 shows heating elements connected for energization by the apparatus of FIGS. 1 and 2 in the second operational mode for heating two different pipes.

FIG. 6 shows the same mode of operation as FIG. 4, i.e. the second operational mode. However, as shown in FIG. 6, two pipes P2 and P3 are being heated, the heating element 60 in this case being replaced by heating elements 60a and 60b respectively associated with the two pipes P2 and P3.

The thermocouples 22a and 22b are in this case respectively associated with the pipes P2 and P3.

As will be apparent, the heating element 60a is connected across transformer end terminal 17 and centre-tapping CT, i.e. across one half of the secondary winding S, and the heating element 60b is connected across the transformer end terminal 18 and the centre-tapping CT, i.e. across the other half of the secondary winding S.

It will also be apparent that, in the second operational mode illustrated in FIG. 6, the conductor 11b again serves as a common conductor in which the currents through the heating elements are balanced.

The operation of the temperature control devicess illustrated in FIG. 2 will now be described.

As explained above, each of the switches 21a to 21h has three possible positions, corresponding to its respective fixed contacts C1, C2 and C3, and the fixed contacts C1 represent the "off" position of the switching arrangement 21, in which the temperature control devices 20a and 20b are disconnected from the saturable reactors 14 and 15 from the current supply conductor 26.

When the switches 21a to 21h are in the positions shown in FIG. 2, in which they make contact with fixed contacts C2, the bridge rectifier 25a of temperature control device 20a is connected, via switches 21a, 21b, to control terminals 14a, 14b of the saturable reactor 14.

The rectifier bridge 25a is also connected, via switches 21e, 21f, to the terminals 15a, 15b of the saturable reactor 15.

Thus, with the switching arrangement 21 in a first closed condition, i.e. with the switches 21a to 21h contacting the fixed contacts C2, the temperature control device 20a controls both of the saturable reactors 14 and 15.

Electrical current is supplied through movable switch contact 21g to the temperature control device 20a.

Current supply to the temperature control device 20b is interrupted by the open movable switch contact 21h, and the conductors 54 and 55 of the associated recitifer bridge 25b are connected to the open movabl switch contacts 21c and 21d.

The switching condition which has just been described is employed when only the thermocouple 22a is in use, as shown in FIG. 3 or 5, in which case the thermocouple 22b and its lead 21b may be disconnected from the temperature control unit 23b and placed in storage.

When, for example, the heating element 60 is connected as shown in FIGS. 3 or 5, the switches 21a to 21h are in engagement with the fixed contacts C2, so that the temperature control unit 23a is controlling both saturable reactors 14 and 15 and the thermocouple 22b is not in use; and the switches 12 are closed to energize this heating element, the temperature of the pipe P or P1 will rise.

When the temperature sensed by the thermocouple 22 rises to a predetermined value, the temperature control unit 23a responds by opening its closed contacts C to interrupt a control voltage applied to the rectifier bridge 25a and thus to interrupt the d.c. voltage applied by the latter across the control terminals of the saturable reactors 14 and 15. Consequently, the a.c. windings of the saturable reactors develop a high impedance and the current supply to the heating element 60 is reduced.

When it is desired to employ both thermocouples 22a and 22b for independent operation of the saturable reactors 14 and 15, for example in the second operational mode illustrated in FIGS. 4 and 6, the switching arrangement 21 is actuated so that the switches 21a to 22h are moved to the fixed contacts C3.

The bridge rectifier 25a of the temperature control device 20a is then again connected, by the closed switches 21a and 21b, to the terminals 14a, 14b of the saturable reactor, but the switches 21e and 21f are now open, so that the bridge rectifier 25a is no longer connected to the saturable reactor 15.

The temperature control devices 20a and 20b are both energized via the closed switches 21g and 21h.

The bridge rectifier 25b is, in this case, connected to the terminals 15a, 15b of the saturable reactor 15 via the closed switches 21g, 21h.

Thus, the two temperature control devices 20a and 20b are in this case connected for independently controlling the saturable reactors 14 and 15, respectively, and thus for independently controlling the current flow through the conductors 11a and 11c.

The temperatures at which the saturable reactors 14 and 15 are operated can be varied by adjustment of the temperature control units 23a and 23b to vary the temperatures at which the normally closed contacts C are opened.

By adjustment of the variable transformers 24a, 24b, the magnitudes of the d.c. control voltages applied by the rectifier bridges 25a, 25b to the saturable reactors 14, 15 can be infinitely varied to adapt the apparatus to a wide range of pipe diameters and heating element sizes, i.e. numbers of finger elements.

An important advantage of the above-described apparatus is its ability to control the heating of two pipes of different diameters by passing different currents through two heating elements respectively associated with the two pipes, as illustrated in FIG. 6. In this case, the common conductor 11b carries the out of balance current difference between the two heating elements.

Furthermore, the present apparatus is extremely versatile in enabling various sizes of pipes and welds to be heat treated, with simultaneous or staggered heating of the various pipes and/or heating of some pipes while others are cooled, which allows the apparatus to be utilized to maximum advantage in any given situation.

If required, for example in the case of a large diameter pipe, the apparatus may be employed for simultaneously heating different sections or zones of the pipe, the thermocouples being respectively associated with the pipe sections or zones.

As will be readily apparent to those skilled in the art, various modifications may be made in the above-described apparatus wherein the scope of the invention as defined by the following claims. For example, instead of the saturable reactors 14, 15, thyristors, triac assemblies or other solid state means may be employed as current controllers.

Also, the temperature control units 23a, 23b, instead of being the temperature controllers described above, may comprise programmers for varying the predetermined temperatures, at which the contacts C open, in accordance with predetermined programs. In this way, the temperature signals supplied by the thermocouples are compared with signals which are generated within the programmers and which vary with time, thus causing the temperature variations of the pipes being heated to occur in accordance with the programs preset in the programmers. A commercially available programmer which is suitable for this purpose is Digital Control Programmer DCP7700 solid by Honeywell Corporation of Fort Washington, Pa.

I claim:

1. Power supply apparatus for selectively energizing first and second electrical resistance heating elements, comprising power supply transformer means for transforming an electrical supply current;

said power supply transformer means comprising first and second secondary winding means in series with one another for delivering electrical power from said power supply transformer means;

first, second and third conductors for connection to said first and second heating elements;

first and second connecting means for connecting said first and second conductors to respective opposite ends of said secondary winding means;

third connecting means for connecting said third conductor between said first and second secondary winding means;

first and second temperature sensing means for providing first and spaced temperature signals corresponding to the temperatures of zones heated by said first and second heating elements, respectively;

first and second temperature responsive control means for providing power supply control signals in response to said first and second temperature signals, respectively;

first and second control signal responsive means for varying the current flow through said first and second connecting means in response to the power supply control signals;

switch means for connecting said first and second temperature responsive control means to said first and second control signal responsive means, respectively, to control the latter independently of one another, in a first switch position and for connecting said first temperature responsive control means to both of said first and second control signal responsive means, to effect common control of the latter, and disconnecting said second temperature responsive control means from said second control signal responsive means in a second switch position; whereby said apparatus can be operated to deliver electrical power in a first operational mode form both of said secondary winding means in a single heating circuit, in a second operational mode from said first and second secondary winding means in two respective heating circuits and in a third operational mode from one of said first and second secondary winding means in a single heating circuit.

2. Apparatus as claimed in claim 1, further comprising a pair of manually adjustable means respectively associated with said temperature responsive control means adjusting the power supply control signals.

3. Apparatus as claimed in claim 1, wherein each of said temperature responsive control means is adjustable for varying the sensed temperature at which the respective said control signal responsive means are operated.

4. Apparatus as claimed in claim 1, wherein said current control means comprise first and second current controllers respectively associated with said second and third conductors, and further comprising switch means for selectively connecting said temperature signal responsive means to one or both of said first and second current controllers.

5. Temperature responsive power supply apparatus for electrical resistance heating, comprising:

power supply transformer means for transforming an electrical supply current;

said power supply transformer means comprising first and second secondary winding means in series with one another for delivering electrical power from said power supply transformer means;

first, second and third conductors for connecting said secondary windings to heating elements;

means for connecting said first conductor between said first and second secondary winding means;

means for connecting said second and third conductors to opposite ends of said first and second secondary winding means, whereby said apparatus can be operated to deliver electrical power in a first operational mode from both of said secondary winding means in a single heating circuit, in a second operational mode from said first and second secondary winding means in two heating circuits with said first conductor common to the two heating circuits, and a third operational mode from one of said first and second secondary winding means in a single heating circuit;

a pair of temperature sensing means for providing respective temperature singals corresponding to the temperatures of respective zones heated by the apparatus;

a pair of current control means respectively associated with said second and third conductors for controlling the flow of electrical current therethrough;

a pair of means respectively associated with said temperature sensing means and respectively responsive to said temperature signals for operating said current control means to reduce said electrical current flow when said temperatures reach predetermined values; and switching means for selectively connecting said pair of temperature signal responsive means to said pair of current control means, respectively, in a first switching position for independent control of said current control means and for connecting one of said temperature signal responsive means to both of said current control means for simultaneous operation thereof in a second switching position.

6. Apparatus as claimed in claim 2, wherein said manually adjustable means each comprise a variable transformer and said temperature responsive control means comprise switch means for controlling the connection of said variable transformers to said control signal responsive means.

* * * * *

UNITED STATES PATENT AND TRADEMARK OFFICE
CERTIFICATE OF CORRECTION

PATENT NO. : 4,237,369

DATED : December 2, 1980

INVENTOR(S) : ROBERT H. JONES

It is certified that error appears in the above—identified patent and that said Letters Patent is hereby corrected as shown below:

[54] in the title, change "WILD" to --WELD--.

Signed and Sealed this

Nineteenth Day of May 1981

[SEAL]

Attest:

RENE D. TEGTMEYER

*Attesting Officer*   *Acting Commissioner of Patents and Trademarks*